(12) United States Patent
Collins

(10) Patent No.: US 10,301,915 B2
(45) Date of Patent: May 28, 2019

(54) SEAL CONFIGURATION FOR ESP SYSTEMS

(71) Applicant: GE Oil & Gas Esp, Inc., Oklahoma City, OK (US)

(72) Inventor: Charles Collins, Oklahoma City, OK (US)

(73) Assignee: GE Oil & Gas Esp, Inc., Oklahoma City, OK (US)

(*) Notice: Subject to any disclaimer, the term of this patent is extended or adjusted under 35 U.S.C. 154(b) by 27 days.

(21) Appl. No.: 15/105,587

(22) PCT Filed: Dec. 20, 2013

(86) PCT No.: PCT/US2013/077180
§ 371 (c)(1),
(2) Date: Jun. 17, 2016

(87) PCT Pub. No.: WO2015/094364
PCT Pub. Date: Jun. 25, 2015

(65) Prior Publication Data
US 2017/0030171 A1    Feb. 2, 2017

(51) Int. Cl.
*E21B 43/12*     (2006.01)
*F04D 13/10*    (2006.01)
(Continued)

(52) U.S. Cl.
CPC ............. *E21B 43/128* (2013.01); *F04D 13/10* (2013.01); *F04D 29/126* (2013.01); *F16J 15/324* (2013.01);
(Continued)

(58) Field of Classification Search
CPC .................................................... E21B 43/128
See application file for complete search history.

(56) References Cited

U.S. PATENT DOCUMENTS

| 4,669,961 A | 6/1987 | Lorett |
| 4,940,911 A | 7/1990 | Wilson |
(Continued)

FOREIGN PATENT DOCUMENTS

| GB | 1 364 265 A | 8/1974 |
| GB | 2 442 611 A | 4/2008 |
(Continued)

OTHER PUBLICATIONS

International Search Report and Written Opinion issued in connection with corresponding PCT application PCT/US2013/077180 dated Sep. 29, 2014.
(Continued)

*Primary Examiner* — Giovanna C. Wright
(74) *Attorney, Agent, or Firm* — Laura L. Pollander

(57) ABSTRACT

An electric submersible pumping system is configured to pump fluids from a wellbore. The electric submersible pumping system includes a motor filled with dielectric motor lubricant and a pump driven by the motor. The electric submersible pumping system further includes an upper seal section connected to the motor and filled with seal section oil. The electric submersible pumping system also includes a lower seal section connected to the motor. In preferred embodiments, the lower seal section includes an expansible bladder that isolates the dielectric motor lubricant from wellbore fluids. The upper seal section is in fluid isolation from the motor. The lower seal section is in fluid communication with the motor.

19 Claims, 7 Drawing Sheets

(51) Int. Cl.
*F04D 29/12* (2006.01)
*H02K 9/19* (2006.01)
*H02K 7/14* (2006.01)
*F16J 15/324* (2016.01)
*F04B 47/06* (2006.01)
*F04D 13/08* (2006.01)
*F04D 29/08* (2006.01)

(52) U.S. Cl.
CPC ............... *H02K 7/14* (2013.01); *H02K 9/19* (2013.01); *F04B 47/06* (2013.01); *F04D 13/08* (2013.01); *F04D 29/086* (2013.01); *H02K 2207/03* (2013.01)

(56) References Cited

U.S. PATENT DOCUMENTS

| | | | |
|---|---|---|---|
| 6,602,059 B1 * | 8/2003 | Howell | F04B 47/06 184/6.21 |
| 7,066,248 B2 | 6/2006 | Howell | |
| 7,363,983 B2 | 4/2008 | Martinez et al. | |
| 7,530,391 B2 | 5/2009 | Hall et al. | |
| 7,624,795 B1 | 12/2009 | Bangash et al. | |
| 7,658,227 B2 | 2/2010 | Fox et al. | |
| 7,665,975 B2 | 2/2010 | Parmeter et al. | |
| 7,841,395 B2 | 11/2010 | Gay et al. | |
| 8,419,387 B1 | 4/2013 | Karbs | |
| 8,474,520 B2 | 7/2013 | Martinez et al. | |
| 9,145,885 B2 * | 9/2015 | Bouldin | F04B 47/02 |
| 2007/0140876 A1 | 6/2007 | Parmeter | |
| 2007/0277969 A1 * | 12/2007 | Hall | E21B 43/128 166/105 |
| 2010/0078177 A1 * | 4/2010 | Parmeter | E21B 43/128 166/369 |
| 2012/0255727 A1 * | 10/2012 | Cameron | E21B 27/005 166/250.01 |
| 2012/0257998 A1 | 10/2012 | Parmeter | |

FOREIGN PATENT DOCUMENTS

| | | |
|---|---|---|
| RU | 2 238 441 C1 | 10/2004 |
| RU | 2 353 812 C2 | 4/2009 |
| RU | 2 464 691 C1 | 10/2012 |
| SU | 436415 A1 | 7/1974 |
| WO | 2001/039353 A1 | 5/2001 |

OTHER PUBLICATIONS

Lea et al., "ESP Pumps: The Operators Options for Successful Installation and Run Time," ROGTEC Russian oil & Gas Technologies, pp. 1-8, (May 29, 2009).

Office Action and Search issued in connection with corresponding RU Application No. 2016124152 dated Oct. 16, 2017.

* cited by examiner

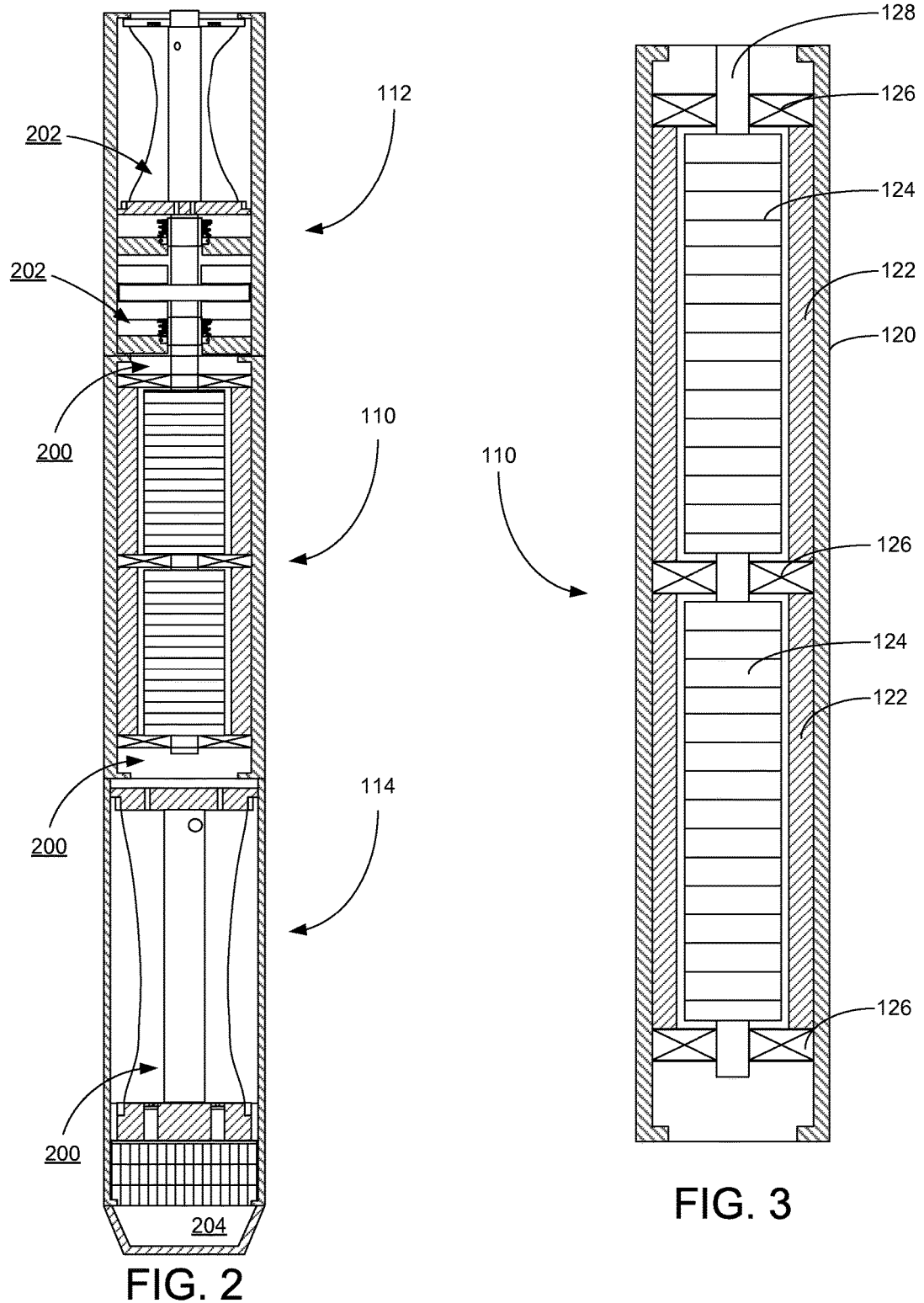

SEAL CONFIGURATION FOR ESP SYSTEMS

FIELD OF THE INVENTION

This invention relates generally to the field of submersible pumping systems, and more particularly, but not by way of limitation, to a system in which different lubricants are used in the motor and seal section portions of the pumping system.

BACKGROUND

Submersible pumping systems are often deployed into wells to recover petroleum fluids from subterranean reservoirs. Typically, the submersible pumping system includes a number of components, including one or more fluid filled electric motors coupled to one or more high performance pumps located above the motor. When energized, the motor provides torque to the pump, which pushes wellbore fluids to the surface through production tubing. Each of the components in a submersible pumping system must be engineered to withstand the inhospitable downhole environment.

Components commonly referred to as "seal sections" protect the electric motors and are typically positioned between the motor and the pump. In this position, the seal section provides several functions, including transmitting torque between the motor and pump, restricting the flow of wellbore fluids into the motor, protecting the motor from axial thrust imparted by the pump, and accommodating the expansion and contraction of motor lubricant as the motor moves through thermal cycles during operation.

Prior art seal sections typically include a "clean side" in fluid communication with the electric motor and a "contaminated side" in fluid communication with the wellbore. Bellows or bags have been used to separate the clean side of the seal section from the contaminated side. Although generally effective, prior art designs rely on the communication of fluid between the motor and the seal section. Because the lubricant is common to both the motor and the seal section, the same fluid must be used. It is to this and other restrictions in the prior art that the preferred embodiments are directed.

SUMMARY OF THE INVENTION

In preferred embodiments, the present invention includes an electric submersible pumping system that is configured to pump fluids from a wellbore. The electric submersible pumping system includes a motor filled with motor lubricant and a pump driven by the motor. The electric submersible pumping system further includes an upper seal section and a lower seal section connected to opposite ends of the motor. The upper seal section is filled with seal section oil that is different from the motor lubricant, often a dielectric type oil. The seal section oil in the upper seal section is isolated from the motor lubricant in the motor. In contrast, the lower seal section is in fluid communication with the motor. In preferred embodiments, the lower seal section includes an expansible bladder or piston that isolates the dielectric motor lubricant from wellbore fluids.

BRIEF DESCRIPTION OF THE DRAWINGS

FIG. 2 provides a cross-sectional view of the motor, lower seal section and seal section constructed in accordance with a presently preferred embodiment.

FIG. 3 presents a cross-sectional representation of the motor of the pumping system from FIG. 2.

DETAILED DESCRIPTION OF THE PREFERRED EMBODIMENTS

Figure 1:
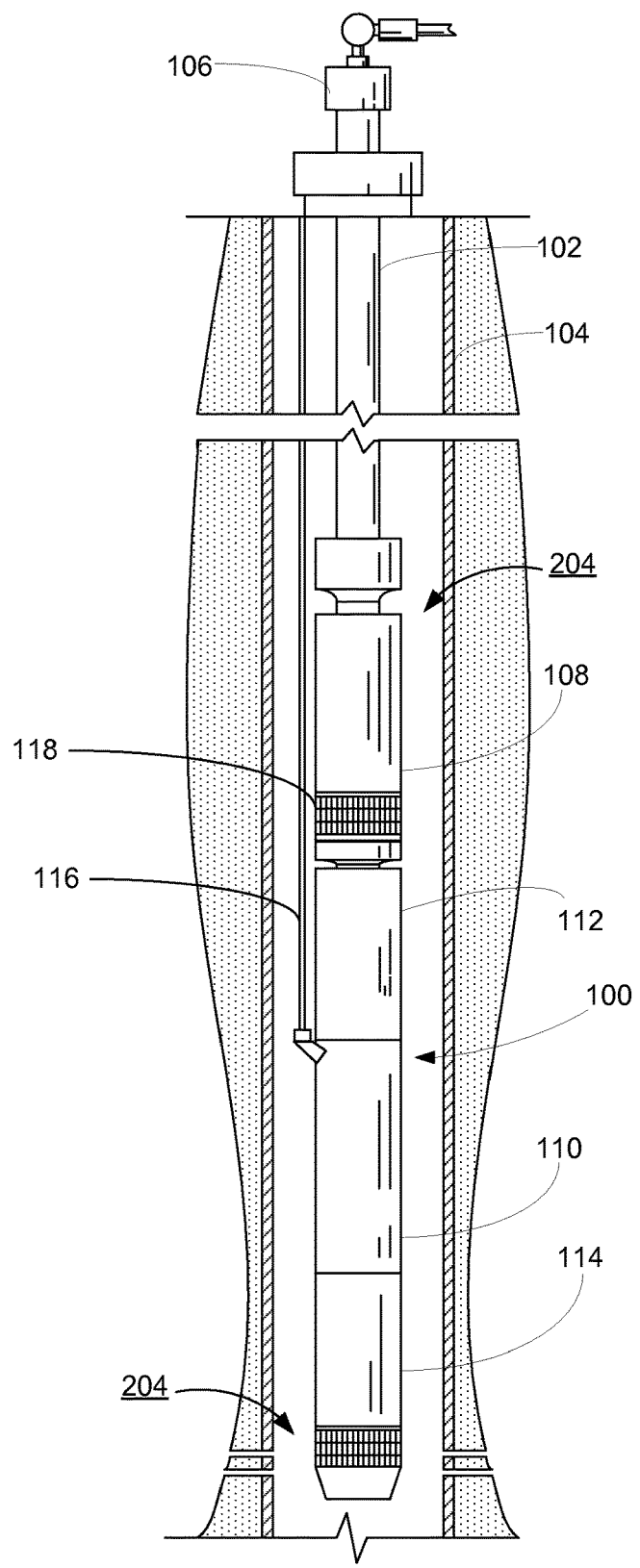
FIG. 1 depicts a submersible pumping system constructed in accordance with a preferred embodiment of the present invention.

In accordance with a preferred embodiment of the present invention, FIG. 1 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas.

The pumping system 100 preferably includes a pump 108, a motor 110, an upper seal section 112 and a lower seal section 114. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system are primarily disclosed in a submersible application, some or all of these components can also be used in surface pumping operations.

Generally, the motor 110 is configured to drive the pump 108. In a particularly preferred embodiment, the pump 108 is a turbomachine that uses one or more impellers and diffusers to convert mechanical energy into pressure head. In alternate embodiments, the pump 108 is configured as a positive displacement pump. The pump 108 includes a pump intake 118 that allows fluids from the wellbore 104 to be drawn into the pump 108. The pump 108 forces the wellbore fluids to the surface through the production tubing 102.

In the preferred embodiments, the upper seal section 112 is positioned above the motor 110 and below the pump 108. The lower seal section 114 is positioned below the motor 110. Although only one of each component is shown, it will be understood that more can be connected when appropriate, that other arrangements of the components are desirable and that these additional configurations are encompassed within the scope of preferred embodiments. For example, in many applications, it is desirable to use tandem-motor combinations, gas separators, multiple seal sections, multiple pumps, sensor modules and other downhole components.

It will be noted that although the pumping system 100 is depicted in a vertical deployment in FIG. 1, the pumping system 100 can also be used in non-vertical applications, including in horizontal and non-vertical wellbores 104. Accordingly, references to "upper" and "lower" within this disclosure are merely used to describe the relative positions of components within the pumping system 100 and should not be construed as an indication that the pumping system 100 must be deployed in a vertical orientation.

Referring now also to FIGS. 2 and 3, shown therein is a cross-sectional view of the upper seal section 112, motor 110 and lower seal section 114. As depicted in the close-up view of the motor 110 in FIG. 3, the motor 110 preferably includes a motor housing 120, stator assembly 122, rotor assembly 124, rotor bearings 126 and a motor shaft 128. The stator assembly 122 includes a series of stator coils (not separately designated) that correspond to the various phases of electricity supplied to the motor 110. The rotor assembly 124 is keyed to the motor shaft 128 and configured for rotation in close proximity to the stationary stator assembly 122. The size and configuration of the stator assembly 122 and rotor assembly 124 can be adjusted to accommodate application-specific performance requirements of the motor 110.

Sequentially energizing the various series of coils within the stator assembly 122 causes the rotor assembly 124 and motor shaft 128 to rotate in accordance with well-known electromotive principles. The motor bearings 126 maintain the central position of the rotor assembly 124 within the stator assembly 122 and oppose radial and axial forces generated by the motor 110 on the motor shaft 128.

The motor 110 is filled with motor lubricant 200 during manufacture that reduces frictional wear on the rotating components within the motor 110. In particularly preferred embodiments, the motor lubricant 200 is a dielectric fluid. As the motor 110 cycles during use and as the motor 110 is exposed to the elevated temperatures in the wellbore 104, the dielectric motor lubricant 200 expands and contracts. It is desirable to prevent the dielectric motor lubricant 200 from becoming contaminated with wellbore fluids 204 and solids in the wellbore 104. To permit the expansion and contraction of the dielectric motor lubricant 200 under elevated wellbore temperatures, the lower seal section 114 is connected to the motor 110 and placed in fluid communication with the dielectric motor lubricant lubricating oil 200. Notably, the upper seal section 112 is not configured to provide an exchange of fluids with the motor 110.

Figure 4:
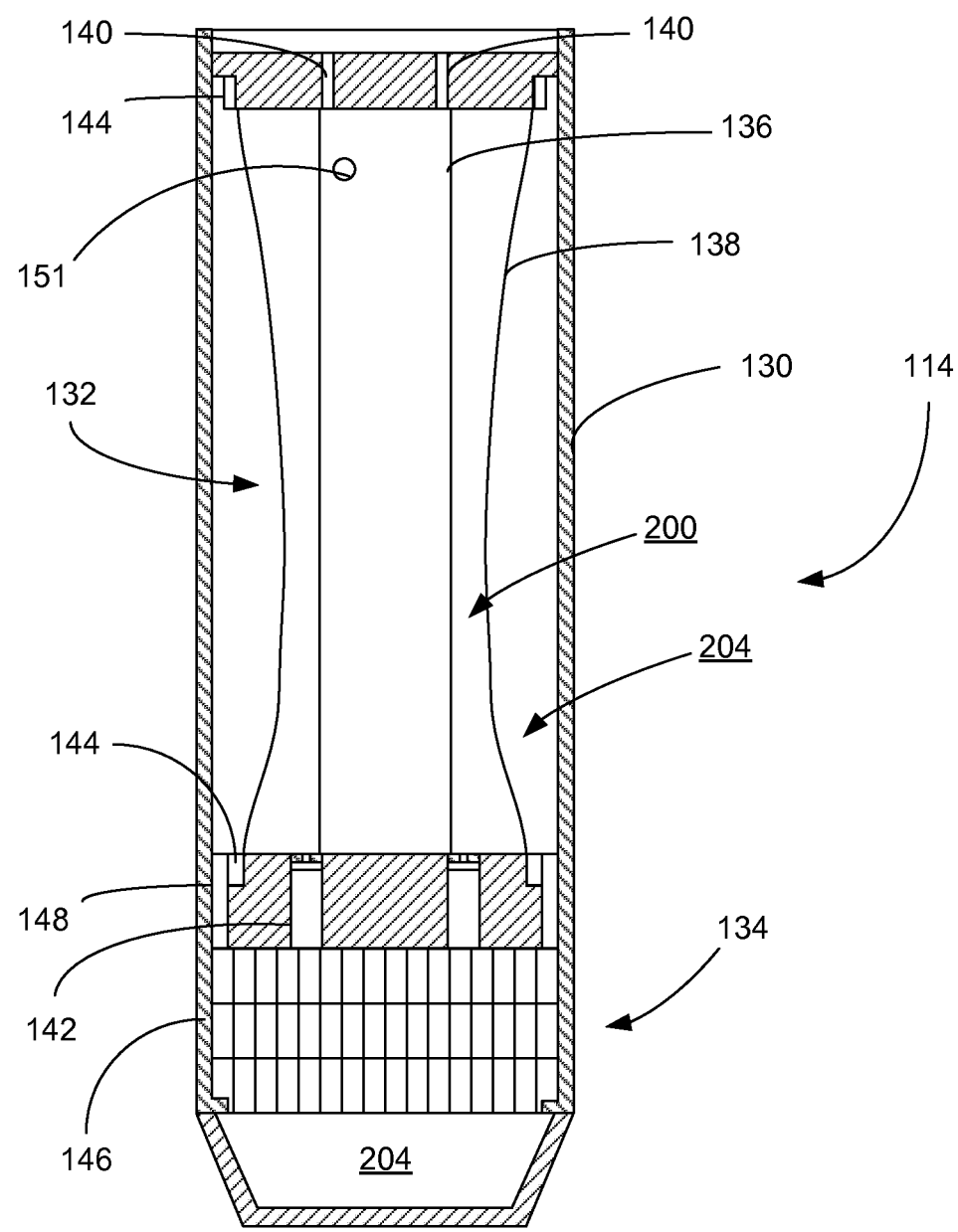
FIG. 4 presents a cross-sectional representation of the lower seal section of FIG. 2 constructed in accordance with a first preferred embodiment.

Continuing with FIG. 2 and referring now also to FIG. 4, shown therein is a cross-sectional view of the lower seal section 114 constructed in accordance with a preferred embodiment. The lower seal section 114 includes a bag seal housing 130, a bag seal assembly 132 and a fluid exchange assembly 134. The bag seal assembly 132 preferably includes a bag support 136, a bladder 138, inlet ports 140 and discharge valves 142. The bag support 136 is rigidly attached to the inside surface of the bag seal housing 130. The bladder 138 is secured to the bag support 136 with compression flanges 144. Alternatively, the bladder 138 can be secured to the bag support 136 with grips or hose clamps. The inlet ports 140 provide a path of fluid communication from the motor 110 to inside of the bladder 138 and bag support 136. Importantly, the bag support 136 permits the passage of fluids between the motor 110 and the bag seal housing 130 only through the inlet ports 140. Wellbore fluids 204 external to the bladder 138 are not allowed to pass directly into the bag seal housing 130.

The discharge valves 142 are preferably one-way relief valves that are configured to open at a predetermined threshold pressure that exceeds the exterior wellbore pressure. In this way, if the fluid pressure inside the bladder 138 exceeds the set-point pressure, the discharge valves 142 open and relieve the pressure inside the bladder 138 by discharging a small volume of motor lubricant 200 into the wellbore 104. In a particularly preferred embodiment, the bladder 138 is manufactured from a high-temperature polymer or elastomer. Suitable polymers and elastomers include AFLAS, polytetrafluoroethylene (PTFE), perfluoroalkoxy (PFA), and polyetherether ketone (PEEK). Alternatively, the bladder 138 can be manufactured from a metal expansible bellows.

The bag seal housing 130 also includes the fluid exchange assembly 134. The fluid exchange assembly 134 includes a solids screen 146 and a plurality of exchange ports 148. The exchange ports 148 allow fluids to pass from the wellbore 104 through the solids screen 146 into the bag seal housing 130 around the exterior of the bladder 138. The solids screen 146 reduces the presence of particulates in the bag seal housing 130. The solids screen 146 is preferably manufactured from a metal or polymer fabric mesh.

During manufacture, the lower seal section 114 is filled with the dielectric motor lubricant 200. As the fluid in the motor 110 expands during operation, it moves downward into the lower seal section 114, through the bag support 136 and into the bladder 138. The bladder 138 expands to accommodate introduction of fluid from the motor 110. As the bladder 138 expands, fluid external to the bladder 138 is expelled through the exchange ports 148 and solids screen 146. If the pressure inside the bladder 138 exceeds the threshold pressure limit of the discharge valves 142, the discharge valves 142 open and vent a portion of the motor lubricant 200 into the wellbore 104.

Conversely, during a cooling cycle, the fluid in the motor 110 contracts and fluid is drawn upward out of the bladder 138. As the volume and pressure inside the bladder 138 decreases, fluid from the wellbore is pulled into the bag seal housing 130 through the solids screen 146 and exchange ports 148. The lower seal section 114 provides a robust mechanism for allowing expansion and contraction of lubricants from the motor 110 while maintaining an isolation barrier between the clean motor lubricants and the contaminated wellbore fluids 204 from the wellbore 104.

Although the lower seal section 114 has been disclosed in preferred embodiments with the bag seal assembly 132, it will be appreciated that additional and alternative sealing mechanism may also be incorporated into the lower seal section 114. For example, it may be desirable to replace the bag seal assembly 132 with a piston-based fluid expansion system. In yet another embodiment, the bag seal assembly 132 is paired with a piston-type seal system.

Figure 5:
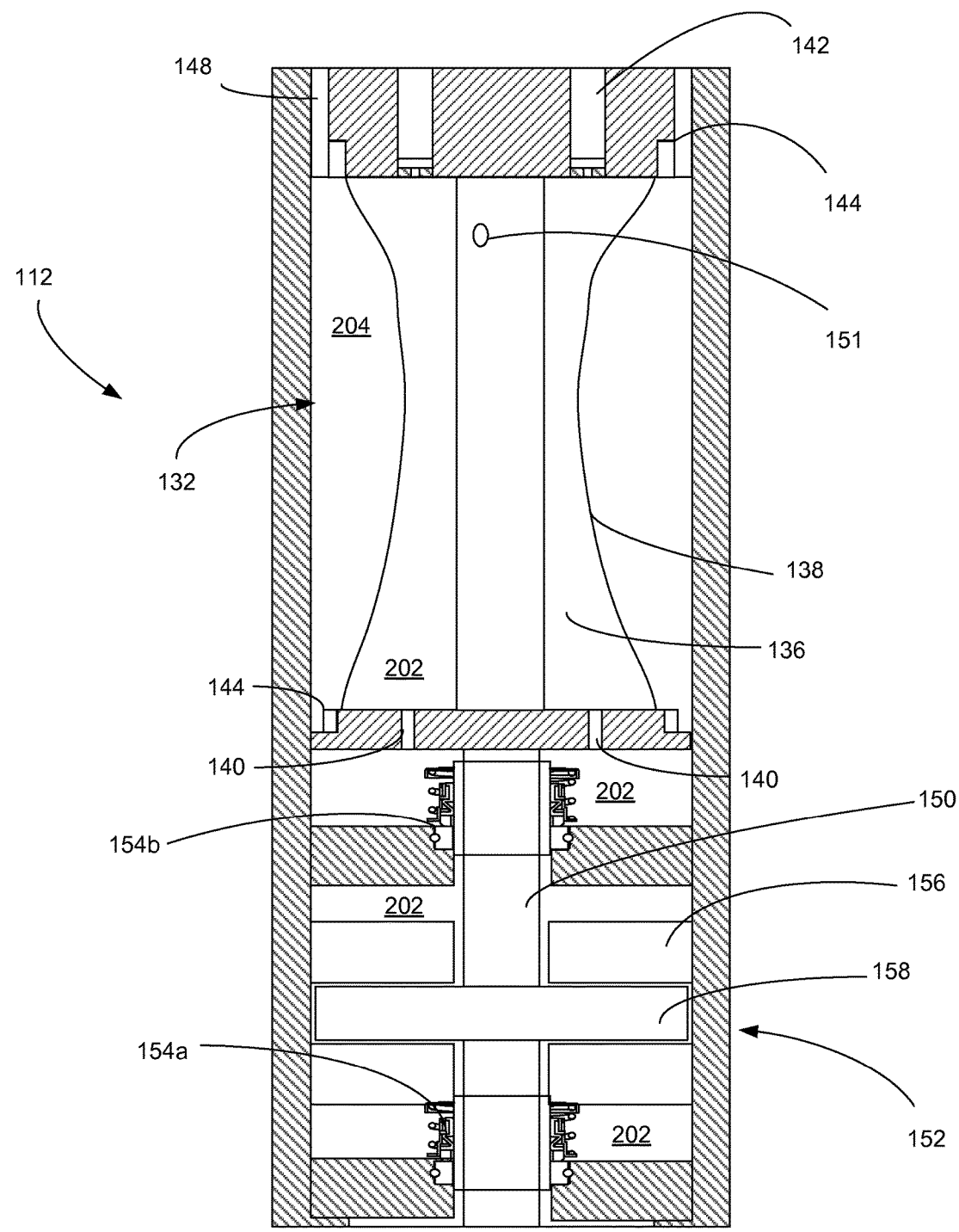
FIG. 5 presents a cross-sectional representation of the upper seal section of FIG. 2 constructed in accordance with a first preferred embodiment.

Turning to FIG. 5, shown therein is a cross-sectional view of the upper seal section 112. The upper seal section 112 is attached to the upper end of the motor 110 and provides a system for accommodating the thrust load of the pump 108. The upper seal section 112 includes a seal section shaft 150, a thrust bearing assembly 152, and one or more mechanical seals 154. During manufacture, the upper seal section 112 is filled with clean seal section oil 202. In preferred embodiments, the seal section oil 202 is different than the dielectric motor lubricant 200. The seal section oil 202 preferably has a higher viscosity than the motor lubricant 200 that is beneficial in creating hydrodynamic bearing surfaces within the upper seal section 112.

The seal section shaft 150 is coupled to the motor shaft 128, or formed as a unitary shaft with the motor shaft 128, and transfers torque from the motor 110 to the pump 108. The thrust bearing assembly 152 includes a pair of stationary bearings 156 and a thrust runner 158 attached to the seal section shaft 150. The thrust runner 158 is captured between the stationary bearings 156, which limit the axial displacement of the thrust runner 158 and the motor shaft 128 and seal section shaft 150.

Figure 6:
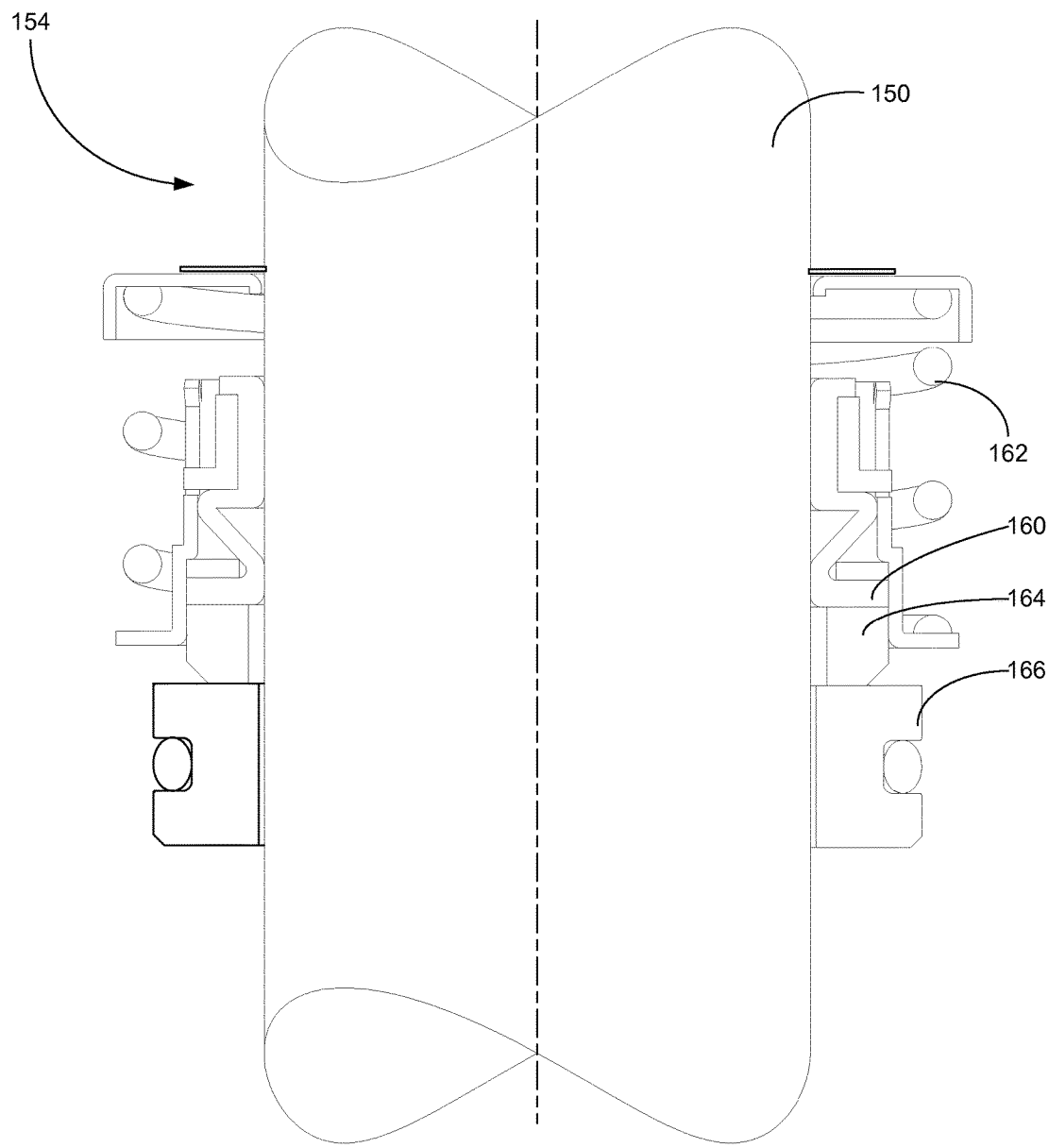
FIG. 6 provides a cross-sectional view of a mechanical seal from the seal section of FIG. 5.

In a particularly preferred embodiment, the upper seal section 112 includes a plurality of mechanical seals 154. Two mechanical seals 154a and 154b are depicted in FIG. 5. As best illustrated in the close-up view of the mechanical seal 154 in FIG. 6, the mechanical seals 154 each include bellows 160, a coiled spring 162, a runner 164 and a stationary ring 166. These components cooperate to prevent the migration of fluid along the seal section shaft 150 and isolate the motor lubricant 200 from the seal section oil 202. The stationary ring 166 has an internal diameter sized to permit the free rotation of the seal section shaft 150. In contrast, the bellows 160, coiled spring 162 and runner 164 rotate with the seal section shaft 150. The rotating runner 164 is held in place against the stationary ring 166 by the spring-loaded bellows 160. The bellows 160 preferably includes a series of folds that allow its length to adjust to keep the runner 164 in contact with the stationary ring 166 if the seal section shaft 150 should experience axial displacement. The bellows 160 may be manufactured from thin corrugated metal or from elastomers and polymers, including AFLAS, perfluoroelastomer, polytetrafluoroethylene (PTFE), perfluoroalkoxy (PFA) and polyethether ketone (PEEK).

The upper seal section 112 preferably also includes a bag seal assembly 132. Like the lower seal section 114, the bag seal assembly 132 in the upper seal section 112 includes the bag support 136, the bladder 138, inlet ports 140 and discharge valves 142. The bag support 136 is rigidly attached to the inside surface of the upper seal section 112. The bladder 138 is secured to the bag support 136 with compression flanges 144. Alternatively, the bladder 138 can be secured to the bag support 136 with grips or hose clamps. The inlet ports 140 provide a path of fluid communication from the motor 110 to inside of the bladder 138 and bag support 150. The outside of the bladder 138 is in fluid communication with the pump 108 and wellbore 104. In this way, the bag seal assembly 132 in the upper seal section 112 isolates the wellbore fluids 204 in the pump 108 from the seal section oil 202 in the upper seal section 112.

Figure 7:
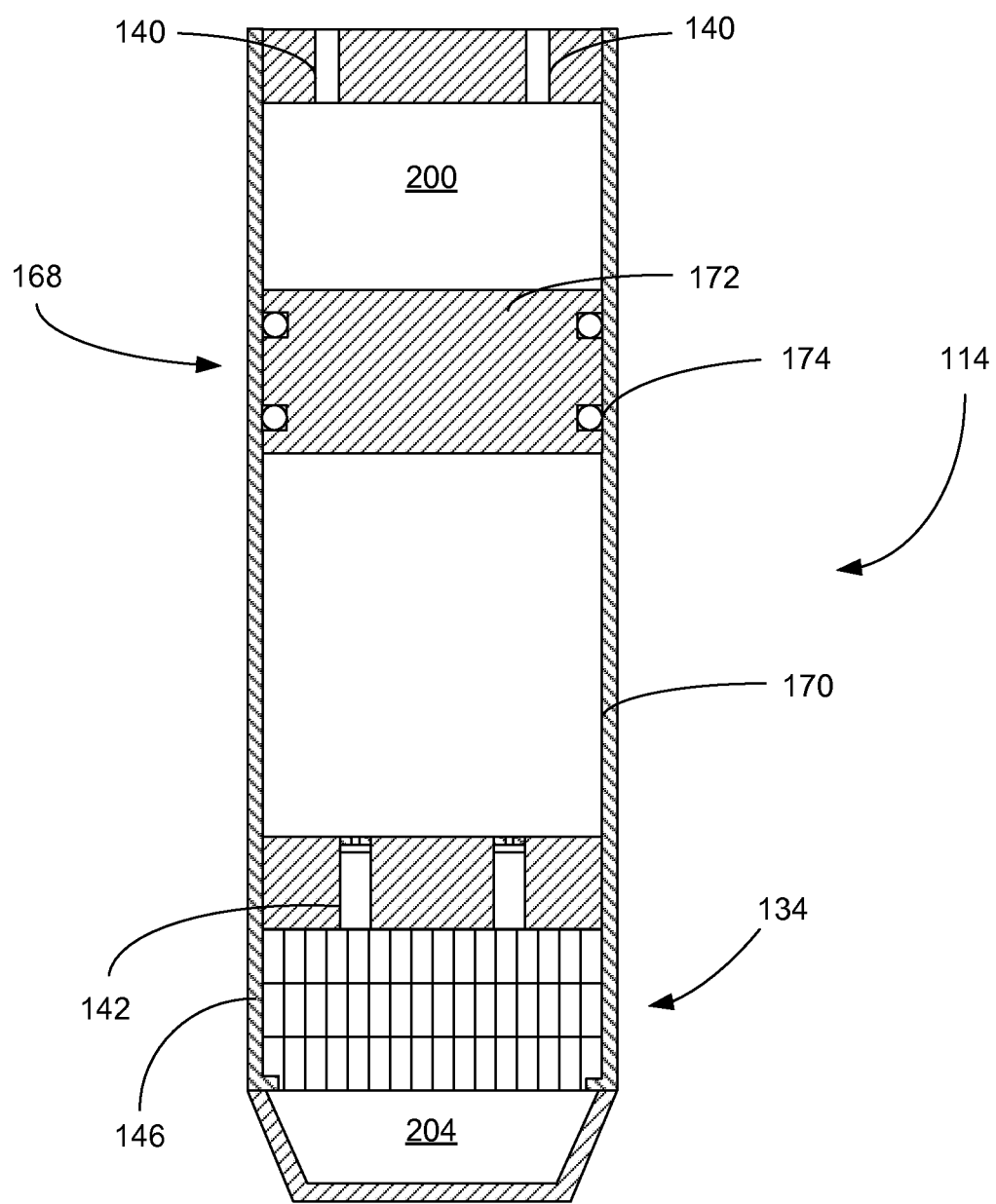
FIG. 7 provides a cross-sectional representation of the lower seal section of FIG. of FIG. 2 constructed in accordance with a second preferred embodiment.
Figure 8:
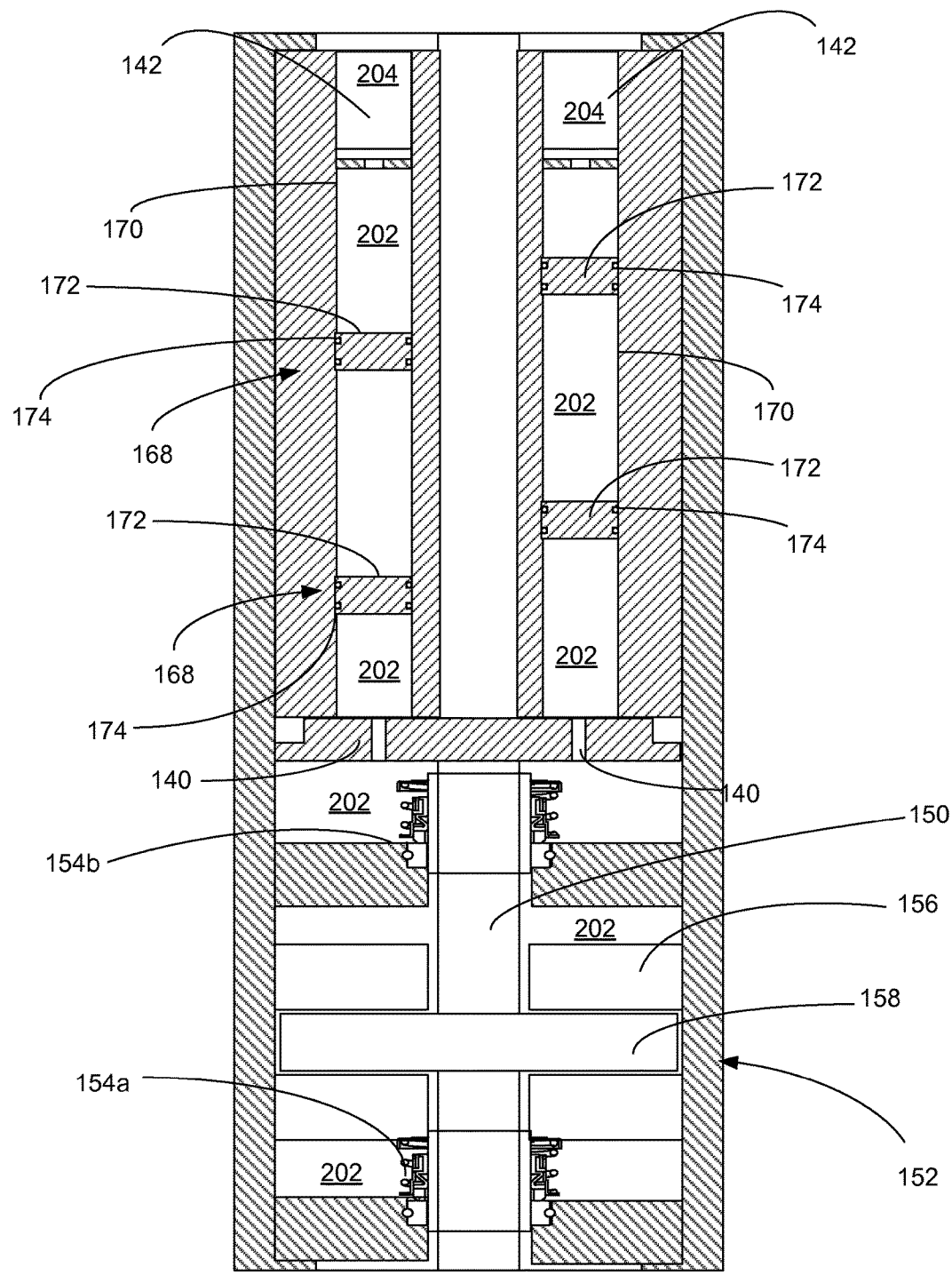
FIG. 8 provides a cross-sectional representation of the upper seal section of FIG. 2 constructed in accordance with a second preferred embodiment.

Turning to FIGS. 7 and 8, shown therein are alternate embodiments of the lower seal section 114 and upper seal section 112, respectively. In the alternate embodiment depicted in FIG. 7, the lower seal section 114 includes a single piston seal assembly 168. The piston seal assembly 168 includes a cylinder 170 and a piston 172. The piston 172 preferably includes one or more ring seals 174. The piston 172 travels through the cylinder 170 in response to a pressure differential and acts as a positive barrier between the motor lubricant 200 and the wellbore fluids 204. It will be appreciated that the piston seal assembly 168 may be used alone or in combination with the bag seal assembly 132.

Similarly, in the alternate embodiment depicted in FIG. 8, the upper seal section 112 includes a plurality of piston seal assemblies 168 surrounding the seal section shaft 150. The piston seal assemblies 168 are preferably employed in combination with the mechanical seals 154 and as an alternative to, or in addition to, the bag seal assembly 132. Each of the plurality of piston seal assemblies 168 includes a cylinder 170 and a piston 172. In the particularly preferred embodiment depicted in FIG. 8, each cylinder 170 includes two or more pistons 172. Each piston 172 preferably includes one or more ring seals 174. Each piston 172 travels through a respective cylinder 170 in response to a pressure differential and acts as a positive barrier between the seal section oil 202 and the wellbore fluids 204 from the pump 108.

Thus, during thermal cycling of the motor 110, the dielectric motor lubricant 200 may expand from the motor 110 into the lower seal section 114. The lower seal section 114 accommodates the expansion of fluid from the motor 110, while the upper seal section 112 prevents migration of fluids along the shafts between the motor 110 and pump 108 and accommodates thrust generated by the pump 108. Notably, the use of the dedicated lower seal section 114 in fluid communication with the motor 110 and the upper seal section 112 in fluid isolation from the motor 110 permits the use of different lubricants within the motor 110 and upper seal section 112. The ability to use different lubricants in the motor 110 and upper seal section represents a significant advancement over the prior art.

In addition to, or as an alternative to the bag seal assemblies 132 and piston seal assemblies 168, the upper seal section 112 and lower seal section 114 may each include other separation systems. For example, it may be desirable to incorporate labyrinth chambers to further isolate fluids and solids from the motor 110. Notably, the bag seal assembly 132 is preferably configured such that an exchange port 151 on the bag support tube 136 is placed at the top of the bag seal assembly 132. The placement of the exchange port 151 at the top of the bag seal assembly 132 encourages the settling of particulates within the lower regions of the bladder 138. This reduces the risk of passing particulates through the bag seal assembly 132.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. An electric submersible pumping system for use in pumping fluids from a wellbore, the electric submersible pumping system comprising:
   a motor, wherein the motor is filled with a first lubricant;
   a pump driven by the motor;
   a lower seal section connected to the motor, wherein the lower seal section is in fluid communication with the motor; and
   an upper seal section connected between the motor and the pump, wherein the upper seal section comprises:
      a shaft;
      one or more mechanical seals,
      a thrust bearing assembly; and
      a piston seal assembly,
      wherein the upper seal section is filled with a second lubricant that is different than the first lubricant.

2. The electric submersible pumping system of claim 1, wherein the first lubricant is dielectric motor lubricant.

3. The electric submersible pumping system of claim 2, wherein the second lubricant is seal section oil that has a viscosity that is higher than the viscosity of the dielectric motor lubricant.

4. The electric submersible pumping system of claim 1, wherein the lower seal section comprises:
   a bag seal housing; and
   a bag seal assembly within the housing.

5. The electric submersible pumping system of claim 4, wherein the bag seal assembly further comprises:
   a bag support; and
   a bladder secured to the bag support.

6. The electric submersible pumping system of claim 5, wherein the bag seal assembly further comprises one or more discharge ports, and wherein each of the one or more discharge ports is configured as a one-way check valve that places the interior of the bladder in fluid communication with the wellbore when each of the one or more discharge ports is opened.

7. The electric submersible pumping system of claim 1, wherein the lower seal section comprises a piston seal assembly.

8. The electric submersible pumping system of claim 1, wherein the lower seal section further comprises a fluid exchange assembly and wherein the fluid exchange assembly comprises:
   a solids screen;
   exchange ports; and
   wherein the fluid exchange assembly is configured to place the exterior of the bladder in fluid communication with the wellbore.

9. The electric submersible pumping system of claim 1, wherein each of the one or more mechanical seals comprises:
   a runner connected to the shaft of the upper seal section; and
   a stationary ring in contact with the runner.

10. An electric submersible pumping system for use in pumping fluids from a wellbore, the electric submersible pumping system comprising:
    a motor, wherein the motor is filled with a first lubricant;
    a pump driven by the motor;
    a lower seal section connected to the motor, wherein the lower seal section is in fluid communication with the motor; and
    an upper seal section connected between the motor and the pump, wherein the upper seal section is filled with a second lubricant, wherein the upper seal section comprises:
    a shaft;
    one or more mechanical seals;
    a thrust bearing assembly; and
    a piston seal assembly.

11. The electric submersible pumping system of claim 10, wherein the first lubricant is dielectric motor lubricant.

12. The electric submersible pumping system of claim 11, wherein the second lubricant is seal section oil that has a viscosity that is higher than the viscosity of the dielectric motor lubricant.

13. The electric submersible pumping system of claim 10, wherein the lower seal section comprises:
    a bag seal housing; and
    a bag seal assembly positioned within the housing.

14. The electric submersible pumping system of claim 13, wherein the bag seal assembly further comprises:
    a bag support; and
    a bladder secured to the bag support.

15. The electric submersible pumping system of claim 10, wherein the lower seal section comprises a piston seal assembly.

16. The electric submersible pumping system of claim 10, wherein each of the one or more mechanical seals comprises:
    a runner connected to the shaft of the upper seal section; and
    a stationary ring in contact with the runner.

17. An electric submersible pumping system configured to pump fluids from a wellbore, the electric submersible pumping system comprising:
    a motor, wherein the motor is filled with dielectric motor lubricant;
    a pump driven by the motor;
    an upper seal section connected to the motor, wherein the upper seal section is in fluid isolation from the motor, wherein the upper seal section comprises:
    a shaft;
    one or more mechanical seals;
    a thrust bearing assembly; and
    a piston seal assembly; and
    a lower seal section connected to the motor, wherein the lower seal section is in fluid communication with the motor.

18. The electric submersible pumping system of claim 17, wherein the upper seal section is filled with seal section oil that is different from the dielectric motor lubricant.

19. The electric submersible pumping system of claim 18, wherein the lower seal section includes an expansible bladder that isolates the dielectric motor lubricant from wellbore fluids.

* * * * *